No. 819,737. PATENTED MAY 8, 1906.
W. G. DANIELSEN.
PLOW.
APPLICATION FILED OCT. 31, 1905.
2 SHEETS—SHEET 2.
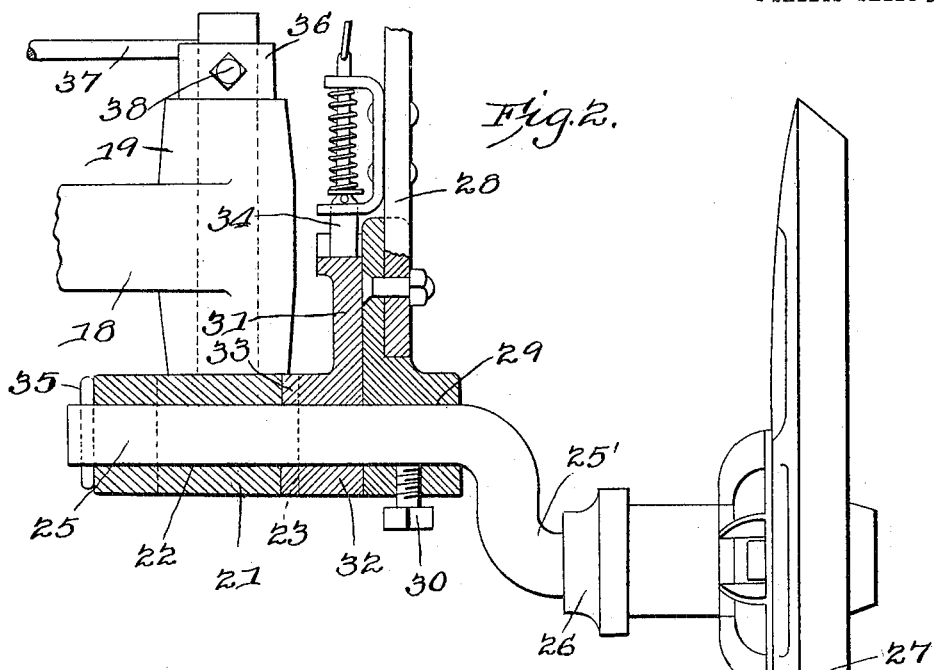
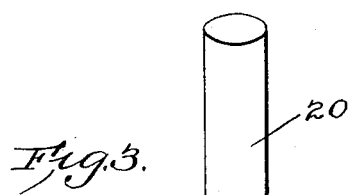
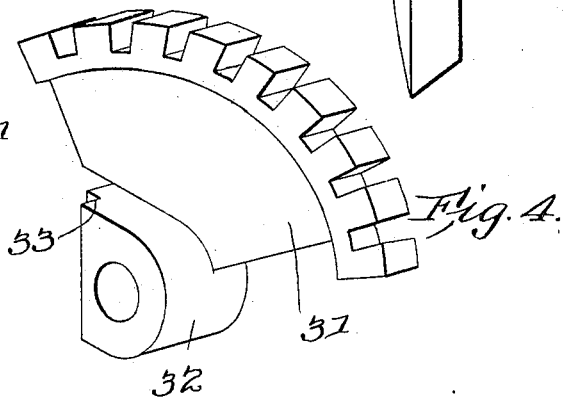
Witnesses
Wilhelm G. Danielsen, Inventor
by
Attorneys

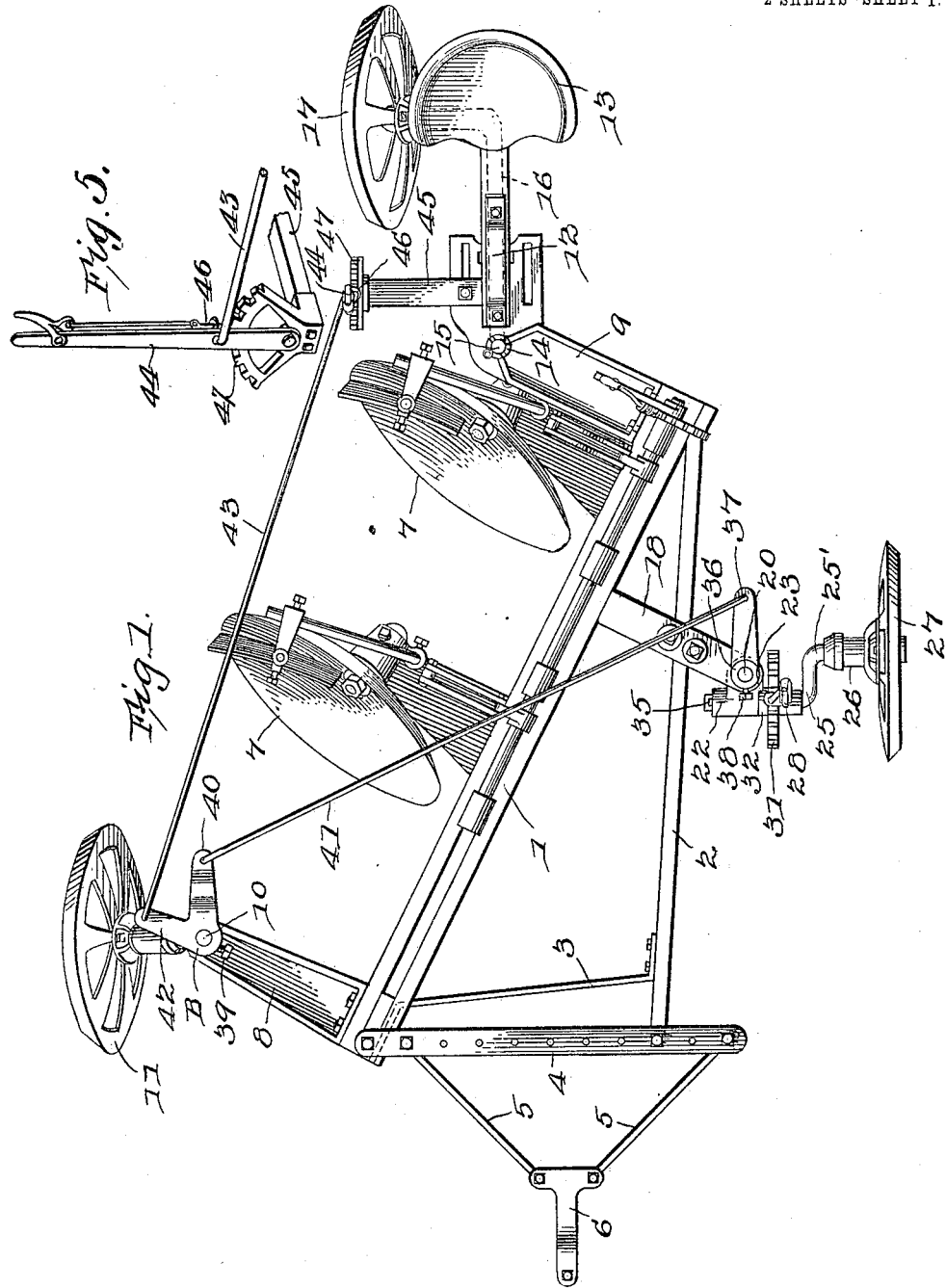

UNITED STATES PATENT OFFICE.

WILHELM G. DANIELSEN, OF LOGAN, UTAH.

PLOW.

No. 819,737.  Specification of Letters Patent.  Patented May 8, 1906.

Application filed October 31, 1905. Serial No. 285,292.

*To all whom it may concern:*

Be it known that I, WILHELM G. DANIELSEN, a citizen of the United States, residing at Logan, in the county of Cache and State of Utah, have invented a new and useful Plow, of which the following is a specification.

This invention relates to riding-plows, and it may be regarded as an improvement on the riding disk plow for which Letters Patent of the United States No. 795,430 were issued to myself on the 25th day of July, 1905.

The present invention has among its objects to improve the steering-gear so as to facilitate the turning of corners when the machine is in operation.

Other objects of the invention are to simplify and improve the mounting of the land-wheel, so as to render the construction thoroughly durable and efficient.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a plan view of a gang disk plow constructed in accordance with the principles of the invention. Fig. 2 is a sectional detail view, enlarged, taken on the plane indicated by the line 2 2 in Fig. 1. Figs. 3 and 4 are perspective detail views of parts of the mechanism. Fig. 5 is a perspective detail view of the operating-lever.

Corresponding parts in the several figures are indicated throughout by similar characters of reference.

The frame of the improved plow is manufactured in accordance with the construction shown and described in my previous Letters Patent referred to above. As seen in the drawings hereto attached, 1 designates the main frame; 2, the auxiliary frame-beam, which is connected at its rear end with the main frame-beam, from which it converges in a forward direction, the front ends of the two beams or frame members being connected by means of a brace 3. A draft attachment is also used, including a pair of perforated straps, one of which is shown at 4, for the attachment, by means of links 5 5, of a T-shaped head or clevis member 6, to which the team may be hitched. The frame supports the disks 7 and related parts, including means for manipulating said disks for the purpose of raising and lowering the same. The frame also includes laterally-extending brackets 8 and 9, the former of which is provided with a bearing for the vertical spindle 10, carrying the front furrow-wheel 11. The bracket 9 is angular in shape, and it supports a spring-bar 12, carrying the driver's seat 13. Said bracket member also is provided with a boss 14, forming a socket for the reception of the vertical arm 15 of an axle 16, which supports the rear furrow-wheel 17.

Extending laterally from the frame in the direction of the land side is a bracket 18, upon the outer end of which is formed a vertically-disposed sleeve 19, constituting a bearing for a spindle 20, upon the lower end of which is formed a head 21, having a transverse bore 22 and formed adjacent to the outer extremity of said bore with a shoulder or offset 23. The bore 22 constitutes a bearing for a rock shaft or axle 25, terminating at its outer end in a crank 25', having a spindle 26, upon which the land-wheel 27 is supported for rotation. The rock-shaft 25 is equipped with an operating-lever 28, having a shaft-engaging eye 29, through which extends a set-screw 30, by means of which the lever is secured upon the shaft.

31 is a rack-segment having a hub 32, engaging the shaft 24, said hub being provided with a recess 33, adapted to engage the shoulder 23 upon the head 21 of the spindle 20, so that when the rack-segment is placed in juxtaposition to the head 21 the engaging parts 23 and 33 will keep the rack-segment from rotating upon the shaft. The lever 28 carries a spring-actuated stop member 34, that engages the rack-segment, so as to retain the operating-lever and related parts in the various positions to which they may be adjusted.

In assembling the parts the spindle 20 is adjusted in the sleeve or socket 19, and the rock-shaft 24 is then placed in the bore or bearing 22, a cotter-pin 35 being driven through the inner end of the rock-shaft, upon which the rack-segment and the lever have been previously loosely placed. The rack-segment is now moved into engagement with the head 21, and the lever is next moved into close relation to the rack-segment and secured by means of the set-screw 30 upon the rock-shaft. The latter, it will thus be seen, may be oscillated by means of a lever for the purpose of adjusting the land-wheel carried thereby, while the position of the rack-segment is stationary with relation to the frame. By this simple construction of the parts the cost of manufacture is reduced, the parts may be readily disassembled for shipment or repairs, and when assembled they will properly coöperate to produce the desired results.

Upon the upper end of the spindle 20 is secured a collar 36, having a radially-extending arm 37, said collar being secured in position adjustably, as by means of a set-screw 38. The spindle 10 of the front furrow-wheel carries a bell-crank lever B, which is secured adjustably, as by means of a set-screw 39, one arm of said bell-crank lever 40 being connected with the arm 37 by means of a link-rod 41. The other arm 42 of the bell-crank lever B is connected, by means of a link-rod 43, with a lever 44, which is fulcrumed upon an arm 45, adjustably connected with and extending laterally from the angular bracket member 9 in a position convenient to the driver or operator, the lever 44 being equipped with a stop member 46, coöperating with a segment-rack 47 to retain said lever and the parts controlled thereby at various adjustments.

As will be readily seen from the foregoing description, taken in connection with the drawings hereto annexed, the front furrow-wheel and the land-wheel may be simultaneously adjusted to guide the plow in any desired direction by simply manipulating the lever 44, whereby the spindles 10 and 20 will be simultaneously turned in their respective bearings. In this manner the plow may be turned or guided without excessive strain upon the team to turn sharp corners at the angles or corners of the field, the turning being effected more readily and with less expenditure of power than by other means heretofore known to me.

The present improvements are of a simple and efficient nature, and they may be readily applied to various forms of gang-plows, although, as hereinbefore set forth, they have been specially devised to meet the exigencies of the plow structure previously patented to myself and herein previously referred to.

Having thus described the invention, what is claimed is—

1. In a riding-plow, a spindle supported for rotation, a land-wheel connected with said spindle and capable of adjustment independently of the spindle, an upright spindle carrying a leading furrow-wheel, a bell-crank upon the latter spindle, an arm adjustable upon the land-wheel-carrying spindle, a link-rod connecting said arm with one of the arms of the bell-crank, an operating-lever, a link-rod connecting the other arm of the bell-crank with the operating-lever, and means for retaining the latter at various adjustments.

2. In a riding-plow, an approximately vertical spindle supported for rotation and having at its lower end a head provided with a transverse bore, a shaft supported for oscillation in said bore and having a land-wheel-carrying crank, an adjusting-lever secured upon the shaft, a rack-segment supported upon the shaft between the adjusting-lever and the head constituting the bearing for the shaft and engaging said head to be thereby held against rotation upon the shaft, and means for assembling the parts.

3. In a riding-plow, a spindle supported for rotation and having at its lower end a head provided with a transverse bore and with a shoulder or offset, a rock-shaft supported in said bore and having a land-wheel-carrying crank, a rack-segment having a hub loosely engaging said shaft and provided with a recess engaging the offset upon the head of the spindle, an adjusting-lever adjustably secured upon the rock-shaft adjacent to the rack-segment, and a connecting member engaging the rock-shaft adjacent to the head of the spindle.

In testimony that I claim the foregoing as my own I have hereto affixed my signature in the presence of two witnesses.

WILHELM G. DANIELSEN.

Witnesses
  CHRISTIAN J. LARSEN
  FREDERICK SCHOLES.